(12) United States Patent
Hegde et al.

(10) Patent No.: US 10,359,971 B2
(45) Date of Patent: Jul. 23, 2019

(54) STORING MEMORY PROFILE DATA OF AN APPLICATION IN NON-VOLATILE MEMORY

(71) Applicant: Hewlett Packard Enterprise Development LP, Houston, TX (US)

(72) Inventors: Suprateeka Radhakrishna Hegde, Bangalore Karnataka (IN); Shridhar Prakash Joshi, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/651,376

(22) Filed: Jul. 17, 2017

(65) Prior Publication Data

US 2019/0018610 A1    Jan. 17, 2019

(51) Int. Cl.
*G06F 3/06* (2006.01)
*G06F 8/41* (2018.01)

(52) U.S. Cl.
CPC .......... *G06F 3/0659* (2013.01); *G06F 3/0604* (2013.01); *G06F 3/0661* (2013.01); *G06F 3/0679* (2013.01); *G06F 8/443* (2013.01); *G06F 8/4441* (2013.01)

(58) Field of Classification Search
CPC combination set(s) only.
See application file for complete search history.

(56) References Cited

U.S. PATENT DOCUMENTS

| | | | |
|---|---|---|---|
| 6,971,091 B1* | 11/2005 | Arnold | G06F 8/443 717/130 |
| 7,367,024 B2 | 4/2008 | Barua et al. | |
| 2003/0140337 A1 | 7/2003 | Aubury | |
| 2010/0169602 A1 | 7/2010 | Hulbert et al. | |
| 2014/0047209 A1 | 2/2014 | Pizlo et al. | |
| 2016/0274999 A1* | 9/2016 | Florez-Larrahondo | H04L 67/10 |
| 2016/0328169 A1 | 11/2016 | Hassan | |

OTHER PUBLICATIONS

Hu, J. et al., "Management and Optimization for Nonvolatile Memory-Based Hybrid Scratchpad Memory on Multicore Embedded Processors", ACM Transactions on Embedded Computing Systems, vol. 13, No. 4, Article 79, Feb. 2014, 25 pages.
Yang, H-J. et al., "Automatic Construction of Program-Optimized FPGA Memory Networks", FPGA, Feb. 22-24, 2017, 10 pages.

* cited by examiner

*Primary Examiner* — Yong J Choe
(74) *Attorney, Agent, or Firm* — Hewlett Packard Enterprise Patent Department

(57) ABSTRACT

Some examples relate to storing memory profile data of an application in a non-volatile memory. In an example, source code of an application may be compiled into an instrumented code for generating profile data of the application. In an example, the profile data may include memory profile data related to memory usage of the application. Next, the profile data comprising the memory profile data of the application may be generated using the instrumented code. The application may be recompiled based on the profile data that includes the memory profile data of the application. Data for storing in a non-volatile memory (NVM) may be identified from the memory profile data of the application. The identified data may be stored in the NVM.

20 Claims, 3 Drawing Sheets

STORING MEMORY PROFILE DATA OF AN APPLICATION IN NON-VOLATILE MEMORY

BACKGROUND

Non-volatile memory (NVM) is a type of computer memory that retains its contents when power is turned off. Examples of non-volatile memory may include read-only memory, flash memory, hard disk drives, floppy disks, magnetic tape, and optical discs.

BRIEF DESCRIPTION OF THE DRAWINGS

The following detailed description references the drawings, wherein.

DETAILED DESCRIPTION

Volatile memory, contrary to non-volatile memory, is computer memory that requires power to maintain the stored information. Volatile memory (for example, random access memory (RAM)) retains its contents while powered on but when the power is interrupted, the stored data may be lost immediately or very rapidly. An application may load data to volatile memory, for example, during application startup or later for various activities. Since data stored in a volatile memory is lost when power is turned off, the application may have to load the data again in the volatile memory. Needless to say, this may impact application performance considerably.

To address this technical challenge, the present disclosure describes various examples for storing memory profile data of an application in a non-volatile memory. In an example, source code of an application may be compiled into an instrumented code for generating profile data of the application. In an example, the profile data may include memory profile data related to memory usage of the application. Next, the profile data comprising the memory profile data of the application may be generated using the instrumented code. The application may then be recompiled based on the profile data that includes the memory profile data of the application. Data for storing in a non-volatile memory (NVM) may be identified from the memory profile data of the application. The identified data may be stored in the NVM. In an example, when application exists, such data is not unloaded from the NVM. By keeping such data in the NVM, application startup could be faster as every time the application need not load data from a secondary storage to system memory.

Figure 1:
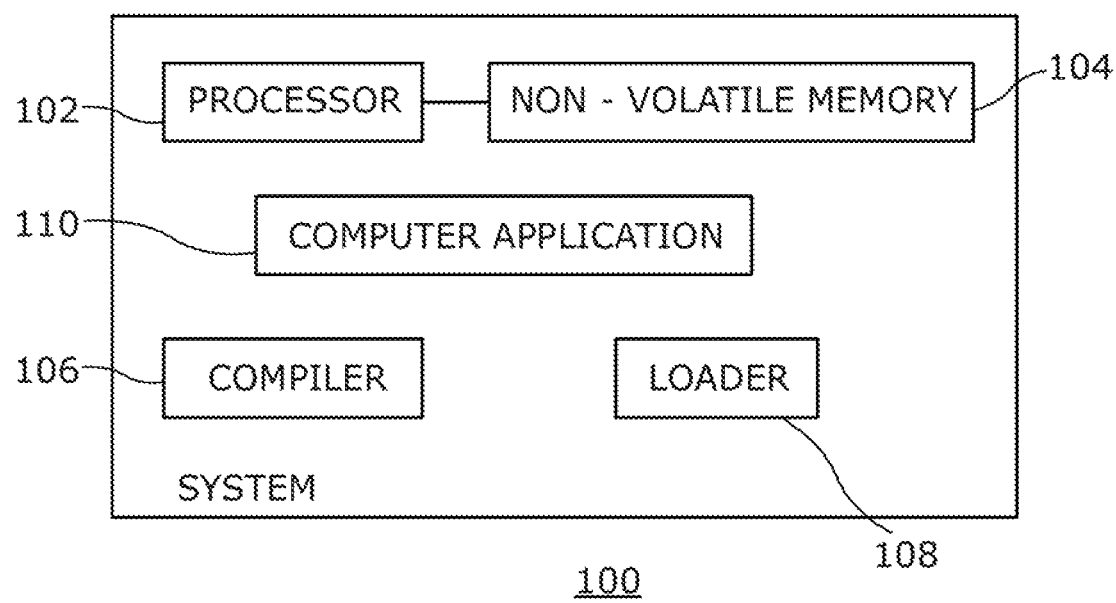
FIG. 1 is a block diagram of an example system for storing memory profile data of an application in a non-volatile memory.

FIG. 1 is a block diagram of an example system 100 for storing memory profile data of an application in a non-volatile memory. In an example, system 100 may represent any type of computing device capable of reading machine-executable instructions. Examples of the computing device may include, without limitation, a server, a desktop computer, a notebook computer, a tablet computer, a thin client, a mobile device, a personal digital assistant (PDA), and the like.

As used herein, the term "server" may include a computer and/or a computer program (machine-readable instructions) that may process requests from other (client) computers over a network.

In an example, system 100 may include a processor 102, a non-volatile memory (NVM) 104, a compiler 106, a loader 108, and a computer application 110.

Processor 102 may be any type of Central Processing Unit (CPU) or processing logic that interprets and executes machine-readable instructions. In an example, processor 102 may include a microcontroller, a microprocessor, a programmable gate array, an application specific integrated circuit (ASIC), a computer processor, or the like. Processor 102 may, for example, include multiple cores on a chip, multiple cores across multiple chips, multiple cores across multiple devices, or combinations thereof. In some examples, processor 102 may include an integrated circuit (IC), other control logic, other electronic circuits, or combinations thereof. Processor 102 may be coupled to memory 104, for example, via a memory bus.

Examples of non-volatile memory (NVM) 104 may include phase change memory (PCM), memristor, read-only memory (ROM), and a Non-Volatile Dual In-line Memory Module (NVDIMM). In some examples, non-volatile memory 104 may be addressable by processor 102. In terms of accessibility, non-volatile memory 104 may be slower than a volatile RAM but faster than secondary storage (for example, flash memory). Secondary storage may be slower to access since they may be read sequentially. Also, the interface that connects a storage device to a system may not be as fast as the interface that NVM uses. Since NVM is far faster compared to secondary storage, performance is extremely high compared to secondary storage. NVM is byte addressable and may be directly addressed by the processor, whereas in the case of secondary storage, the access may be through a controller (for example, a disk controller).

In an example, processor may invoke compiler 106 to perform a profile-based optimization of computer application 110. Profile-based optimization may be defined as a set of performance-improving code transformations based on runtime characteristics of an application. In an example, to perform a profile-based optimization of application 110, compiler 106 may prepare application 110 so that it generates profile data. This process may be referred to as instrumentation. To prepare application 110 for generating profile data, compiler 106 may compile source code of application 110 into an instrumented code. The instrumented code may include additional code that is added to the source code for the purpose of generating data that may be utilized, for example, for performing an analysis (for example, runtime analysis or component testing) related to the application To provide an example, consider that compiler 106 supports the ISO/IEC 14882 Standard for the C++ Programming Language (the international standard for C++). Compiler 106 may compile an application called "sample", which may be built from a C source file sample.c to generate an instrumented program. Compiler 106 may compile application sample.c as follows.

$$aCC+Oprofile=collect-O-c\ sample.C \qquad [1.1]$$

$$aCC+Oprofile=collect-O-o\ sample.exe\ sample.o \qquad [1.2]$$

The aCC command may be used, for example, at the shell prompt to invoke compiler 106. The aCC command may be followed by options and files that are to be compiled.

In the above example, the first command line [1.1] uses the +Oprofile=collect option to prepare the code for instrumentation. The +Oprofile option may instruct compiler 106 to instrument the code for collecting runtime profile data of application 110. The −c option in the first command line suppresses linking and creates an object file called sample.o. The second command line [1.2] uses the −o option to link sample.o into sample.exe. The +Oprofile=collect option instruments sample.exe with data collection code.

In an example, compiler 106 may instrument the code for collecting runtime memory usage data of application 110 ("memory profile data"). In an example, memory profile data of application 110 may be included in the runtime profile data of application 110. In the context of abovementioned example, the following command may be used to instrument the code for collecting runtime memory usage data of application.

aCC+Oprofile=collect+nvprof−O−c sample.C   [1.3]

The "+Oprofile=collect+nvprof" option in the above command line [1.3] may instruct compiler 106 to instrument the code for collecting memory profile data of application 110.

In an example, memory profile data of application 110 may refer to use of a physical memory or virtual memory by application 110. Examples of memory profile data of application 110 may include data related to each method that is called during execution of application 110, total time that a program spent within a method, number of times a method was called, average time per call, data stored in memory during startup of application 110, data stored in memory during runtime of application 110, data that does not change across invocations of application, data that may persist across invocations of application 110, and read-only-data that multiple invocations of same application 110 may share.

Once the instrumented code is generated, the instrumented code may be run with representative data to generate profile data of application 110. In an example, data that closely resembles input data in a user's environment may be used as representative data. In the context of abovementioned example, instrumented code may be run with the following representative data:
sample.exe<input.file1
sample.exe<input.file2

In an example, the profile data of application 110 may be stored in a file, for example, flow.data. In an example, the file may store profile data for multiple input files. For example, in the abovementioned case, flow.data may store profile data from both input files (input.file1 and input.file2). In an example, the profile data may include memory profile data of application 110.

The profile data of application 110 may be used to optimize application 110. To generate an optimized application, application 110 may be recompiled using the profile data of application 110. Compiler 106 may use the profile data to make intelligent optimization decisions on the code thereby generating a highly optimized version of application 110. Optimization may lead to improvements in runtime performance of application 110.

In an example, compiler 106 may identify, from memory profile data of application 110, data that may be stored in non-volatile memory to improve application 110 performance (for example, during application startup or runtime). Examples of such data may include data that does not change across invocations of application 110 (for example, symbol table, debug information, operating system-specific attributes, etc.), data that may persist across invocations of application 110 (for example shared library dynamic relocations, symbol resolution data, etc.), and read-only-data that multiple invocations of same application 110 may share. In an example, compiler 106 may identify the data to be stored in non-volatile memory 104 by using data flow analysis. Data flow analysis is a technique that may be used by compiler 106 for gathering information about the possible set of values calculated at various points in a computer program. A program's control flow graph may be used to determine those parts of a program to which a particular value assigned to a variable might propagate. For example, knowing where a variable like debug was last defined before reaching a given block. The information gathered may be used by compiler 106 for optimizing a program (for example, 110). Examples of optimizations may include constant propagation, common subexpression elimination, and dead code elimination.

Subsequent to the identification, when application 110 starts again, loader 108 may store such data in non-volatile memory. Loader 108 may include a component of an operating system on system 100 that is responsible for loading programs (for example, application 110) and libraries. When application 110 exists, such data is not unloaded from non-volatile memory. By keeping such data in non-volatile memory, application 110 startup could be faster as every time application 110 need not load data from a secondary storage to system memory (for example, RAM). As used herein, secondary storage may include non-volatile storage that is not directly accessible by a processor (for example, 102). Some non-limiting examples of secondary storage may include flash memory, optical discs, magnetic disks and magnetic tape. In an example, the data may be written to non-volatile memory using an application programming interface (API) of a NVM library.

Figure 2:
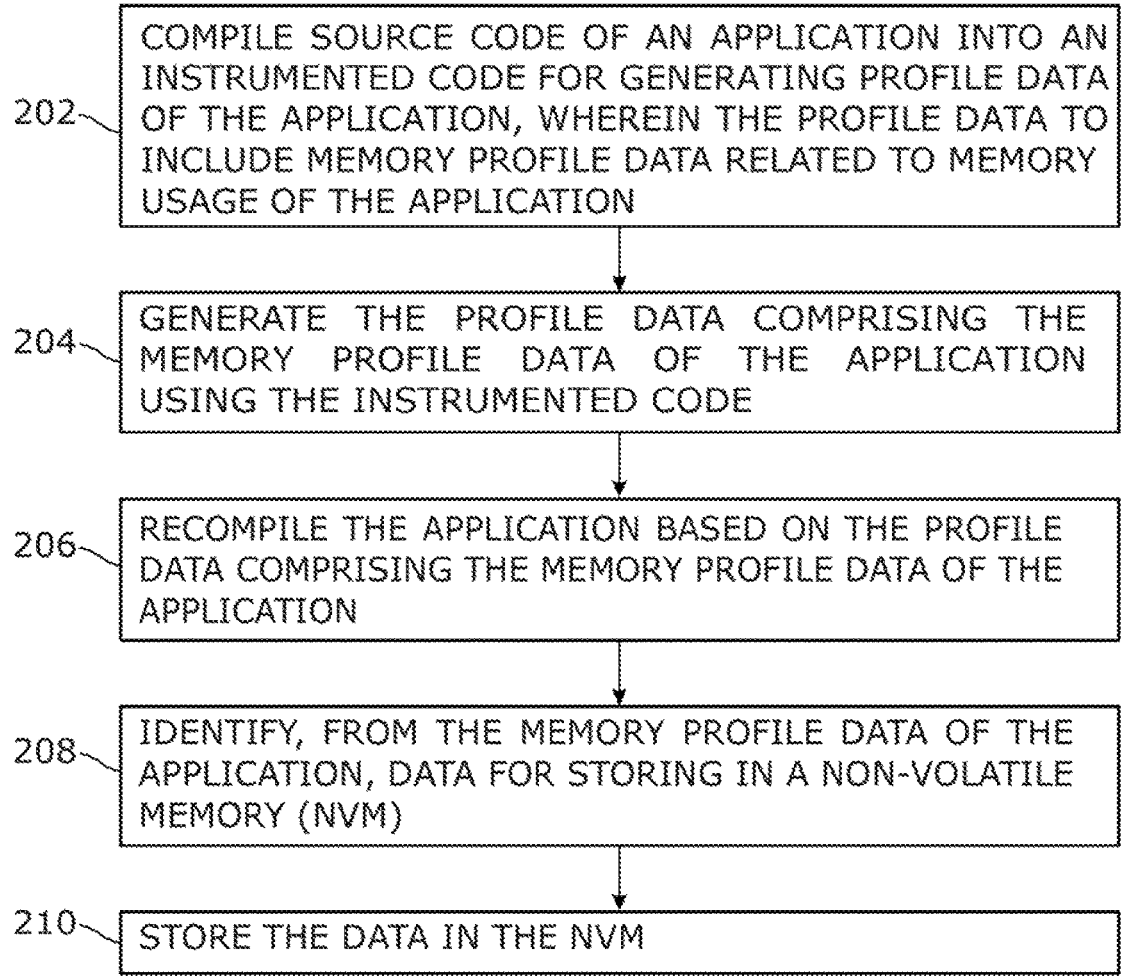
FIG. 2 is a block diagram of an example method of storing memory profile data of an application in a non-volatile memory.

FIG. 2 is a block diagram of an example method 200 of storing memory profile data of an application in a non-volatile memory. The method 200, which is described below, may be executed on system 100 of FIG. 1. However, other devices may be used as well.

At block 202, a processor (for example, 102) may invoke a compiler (for example, 106). In response, the compiler may compile source code of an application into an instrumented code for generating profile data of the application. In an example, the profile data may include memory profile data related to memory usage of a volatile memory (for example, RAM) by the application. At block 204, the instrumented code may be run with representative data. Running the instrumented code with representative data may generate the profile data comprising the memory profile data of the application. At block 206, the compiler may access a file that stores the profile data of the application. The compiler may recompile the application based on the profile data that includes the memory profile data of the application. At block 208, data for storing in a non-volatile memory (NVM) may be identified from the memory profile data of the application. At block 210, the data identified to be stored in the NVM may be accessed. The data may then be stored in the NVM.

Figure 3:
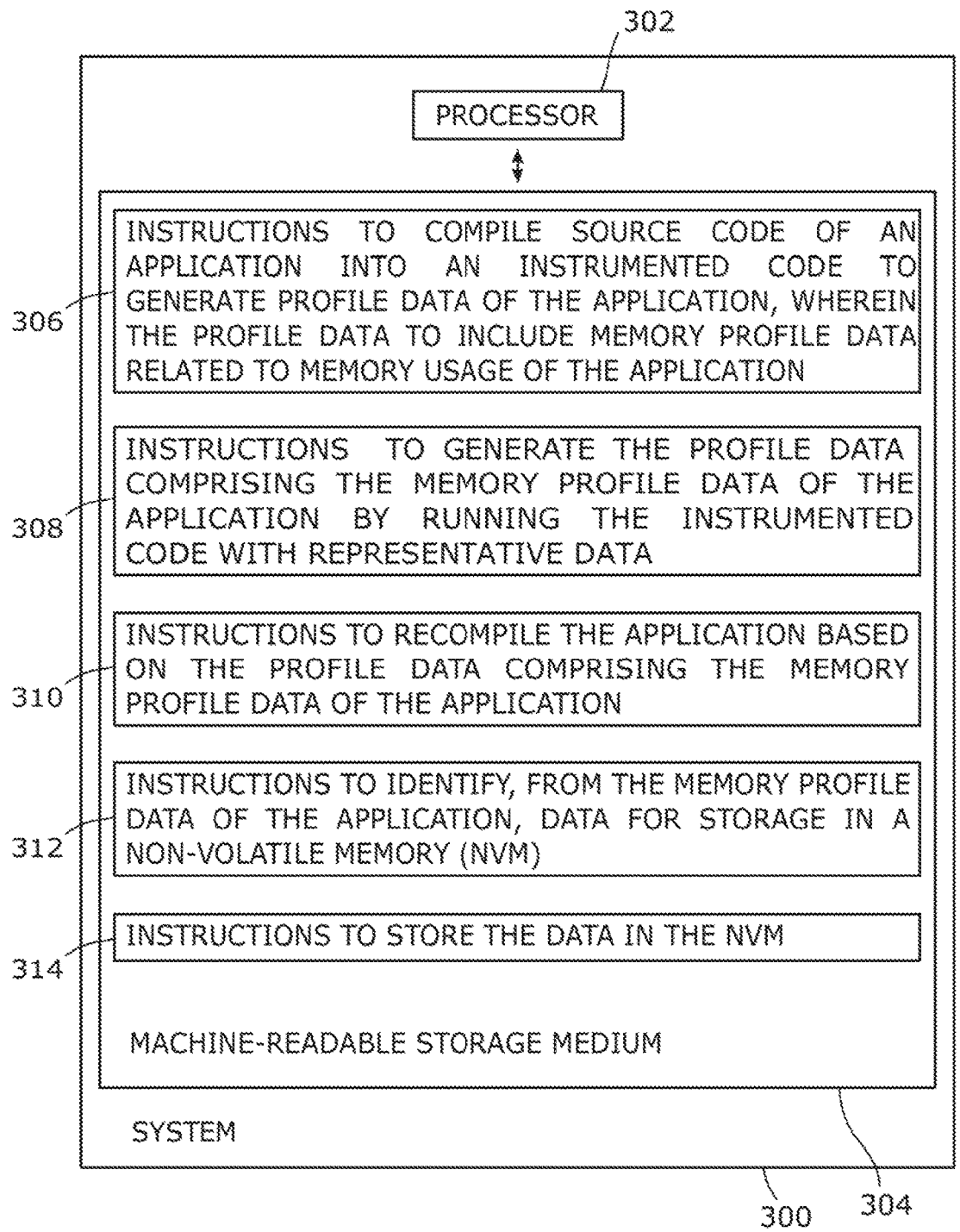
FIG. 3 is a block diagram of an example system including instructions in a machine-readable storage medium for storing memory profile data of an application in a non-volatile memory.

FIG. 3 is a block diagram of an example system 300 including instructions in a machine-readable storage medium for storing memory profile data of an application in a non-volatile memory.

System 300 includes a processor 302 and a machine-readable storage medium 304 communicatively coupled through a system bus. Processor 302 may be any type of Central Processing Unit (CPU), microprocessor, or processing logic that interprets and executes machine-readable instructions stored in machine-readable storage medium 304. Machine-readable storage medium 304 may be a random access memory (RAM) or another type of dynamic storage device that may store information and machine-readable instructions that may be executed by processor 302. For example, machine-readable storage medium 304 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In some examples, machine-readable storage medium 304 may be a non-transitory machine-readable medium. In some examples, machine-readable storage medium 304 may be remote but accessible to system 300.

Machine-readable storage medium 304 may store instructions 306, 308, 310, 312, and 314. In some examples, instructions 306 may be executed by processor 302 to compile source code of an application into an instrumented code to generate profile data of the application. In an example, the profile data may include memory profile data related to memory usage of the application. Instructions 308 may be executed by processor 302 to generate the profile data comprising the memory profile data of the application by running the instrumented code with representative data. Instructions 310 may be executed by processor 302 to recompile the application based on the profile data comprising the memory profile data of the application. Instructions 312 may be executed by processor 302 to identify, from the memory profile data of the application, data for storage in a non-volatile memory (NVM). Instructions 314 may be executed by processor 302 to store the data in the NVM.

For the purpose of simplicity of explanation, the example method of FIG. 3 is shown as executing serially, however it is to be understood and appreciated that the present and other examples are not limited by the illustrated order. The example systems of FIGS. 1, and 3, and method of FIG. 2 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be understood that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method comprising:
by a processor:
compiling source code of an application into an instrumented code for generating profile data of the application, wherein the profile data to include memory profile data related to memory usage of the application;
generating the profile data comprising the memory profile data of the application using the instrumented code;
recompiling the application based on the profile data comprising the memory profile data of the application;
identifying, from the memory profile data of the application, data for storing in a non-volatile memory (NVM); and
storing the data in the NVM.

2. The method of claim 1, further comprising:
using the data in the NVM during execution of the application.

3. The method of claim 1, wherein the data includes data that remains unchanged across invocations of the application.

4. The method of claim 1, wherein the data includes data shared by multiple invocations of the application.

5. The method of claim 4, wherein the data shared by multiple invocations of the application includes read-only data.

6. The method of claim 1, wherein generating the profile data comprising the memory profile data of the application comprises:
running the instrumented code with representative data.

7. A system comprising:
a compiler to:
compile source code of an application into an instrumented code to generate profile data of the application, wherein the profile data to include memory profile data related to memory usage of a volatile memory by the application;
generate the profile data comprising the memory profile data of the application using the instrumented code;
recompile the application based on the profile data comprising the memory profile data of the application; and
identify, from the memory profile data of the application, data for storage in a non-volatile memory (NVM) that is addressable by a central processing unit of the system; and
a loader to:
store the data in the NVM; and
use the data stored in the NVM during execution of the application.

8. The system of claim 7, wherein the non-volatile memory includes a Non-Volatile Dual In-line Memory Module (NVDIMM).

9. The system of claim 7, wherein the instrumented code includes additional code that is added to the source code for performing an analysis related to the application.

10. The system of claim 7, wherein the data includes data that persists across invocations of the application.

11. The system of claim 7, wherein the profile data file is stored in a file.

12. A non-transitory machine-readable storage medium comprising instructions, the instructions executable by a processor to:
  compile source code of an application into an instrumented code to generate profile data of the application, wherein the profile data to include memory profile data related to memory usage of the application;
  generate the profile data comprising the memory profile data of the application by running the instrumented code with representative data;
  recompile the application based on the profile data comprising the memory profile data of the application; and
  identify, from the memory profile data of the application, data for storage in a non-volatile memory (NVM); and store the data in the NVM.

13. The storage medium of claim 12, wherein the instructions to store the data in the NVM include instructions to write the data to the NVM using an application programming interface (API) of a NVM library.

14. The storage medium of claim 12, further comprising instructions to store the profile data in a file.

15. The storage medium of claim 12, further comprising instructions to identify the data in the NVM during execution of the application.

16. The storage medium of claim 12, wherein the instructions to store the data in the NVM include instructions for a loader to load the data in the NVM.

17. The storage medium of claim 12, wherein the non-volatile memory includes at least one of: a phase change memory (PCM) and a memristor.

18. The storage medium of claim 12, wherein the instructions to recompile the application based on the profile data include instructions to access the profile data stored in a file.

19. The storage medium of claim 12, wherein the memory profile data relates to memory usage of a volatile memory.

20. The storage medium of claim 12, wherein the non-volatile memory is addressable by the processor.

* * * * *